(12) United States Patent
Takatani et al.

(10) Patent No.: US 7,362,561 B2
(45) Date of Patent: Apr. 22, 2008

(54) SOLID ELECTROLYTIC CAPACITOR

(75) Inventors: Kazuhiro Takatani, Takatsuki (JP);
Takashi Umemoto, Hirakata (JP);
Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/730,091

(22) Filed: Mar. 29, 2007

(65) Prior Publication Data
US 2007/0232012 A1    Oct. 4, 2007

(30) Foreign Application Priority Data
Mar. 31, 2006  (JP)  ............................. 2006-098904
Feb. 19, 2007  (JP)  ............................. 2007-038653

(51) Int. Cl.
*H01G 9/04*    (2006.01)
(52) U.S. Cl. ........................................... 361/528
(58) Field of Classification Search ........ 361/528–531, 361/523
See application file for complete search history.

(56) References Cited

U.S. PATENT DOCUMENTS

| | | | | |
|---|---|---|---|---|
| 7,126,812 B2 * | 10/2006 | Hirata et al. | ................. | 361/524 |
| 7,126,813 B2 * | 10/2006 | Iida et al. | ................... | 361/528 |
| 7,180,728 B2 * | 2/2007 | Kobayashi | ................... | 361/524 |
| 2007/0025064 A1 * | 2/2007 | Iida et al. | ................... | 361/528 |

FOREIGN PATENT DOCUMENTS

JP          2001-223141          8/2001

* cited by examiner

*Primary Examiner*—Eric Thomas
(74) *Attorney, Agent, or Firm*—NDQ&M Watchstone LLP; Vincent M. DeLuca

(57) ABSTRACT

In a solid electrolytic capacitor provided with an anode, a cathode, and a dielectric layer formed by anodization of the anode, the anode includes a first metal layer and a second metal layer. The first metal layer is made of any of metal selected from niobium, aluminum and tantalum, or an alloy containing any of metal selected from niobium, aluminum and tantalum as a main component. The second metal layer contains any of metal selected from titanium, zirconium and hafnium. Here, a part of a surface of the first metal layer is covered with the second metal layer.

2 Claims, 2 Drawing Sheets

SOLID ELECTROLYTIC CAPACITOR

CROSS REFERENCE TO RELATED APPLICATIONS

This application is based upon and claims the benefit of priority from prior Japanese Patent Application No. 2006-098904, filed on Mar. 31, 2006; and prior Japanese Patent Application No. 2007-038653, filed on Feb. 19, 2007; the entire contents of which are incorporated herein by reference.

BACKGROUND OF THE INVENTION

1. Field of the Invention

The present invention relates to a solid electrolytic capacitor including an anode formed of any of valve metal and an alloy mainly containing valve metal, and a dielectric layer formed by anodization of the anode. More specifically, the present invention relates to a solid electrolytic capacitor intended to reduce a leakage current.

2. Description of the Related Art

In a typical structure of a solid electrolytic capacitor an oxide layer functioning as a dielectric layer is formed in a surface of valve metal by means of anodization, a cathode layer is formed thereon, and then a lead for drawing out a cathode is further attached to the cathode layer. The valve metal refers to a group of metal having a valve action, and including aluminum, tantalum, niobium, and titanium, and the like.

However, when the dielectric layer is formed for each of the above-described solid electrolytic capacitors by anodization, crystalline oxide (defects) is formed inside the dielectric layer. Thereby, cracks are caused at grain boundaries in the dielectric layer. Such defects have small resistance, and thereby cause electric currents to flow through the defects. Accordingly, these solid electrolytic capacitors have a problem that the leakage current increases.

A possible factor for the formation of the defects is attributed to oxygen contained in the valve metal. In order to suppress the leakage current, Japanese Patent Publication No. 2001-223141 discloses nitrogen-containing metal as anode metal of a solid electrolytic capacitor, and the nitrogen-containing metal is formed of a solid solution including nitrogen, and niobium or tantalum, for example.

However, even if the nitrogen-containing metal disclosed in Japanese Patent Publication No. 2001-223141 is used as the anode metal of the solid electrolytic capacitor, the effect of reducing the leakage current is still insufficient.

SUMMARY OF THE INVENTION

A first aspect of the present invention provides a solid electrolytic capacitor having an anode, a cathode, and a dielectric layer formed by anodization of the anode. The anode includes a first metal layer and second metal layers. The first metal layer is made of any of metal selected from the group consisting of niobium, aluminum and tantalum, and an alloy containing any of the metal selected from the group consisting of niobium, aluminum and tantalum as a main component. Each of the second metal layers contains any of metal selected from the group consisting of titanium, zirconium and hafnium. Here, parts of a surface of the first metal layer are covered with the second metal layers.

Preferably, in the first aspect of the present invention, an area of regions of the first metal layer covered with the second metal layers is 0.5% or more and 10% or less, of a surface area of the first metal layer.

Preferably, in the first aspect of the present invention, the second metal layers are respectively dispersed in a plurality of regions, and the plurality of regions cover the parts of the surface of the first metal layer.

DETAILED DESCRIPTION OF THE EMBODIMENT

Next, a solid electrolytic capacitor according to an embodiment of the present invention will be concretely described with reference to the accompanying drawings. It is to be noted that the solid electrolytic capacitor of the present invention is not limited to the one described in the following embodiment, and that various modifications are possible without departing from the scope of the invention.

Figure 1:
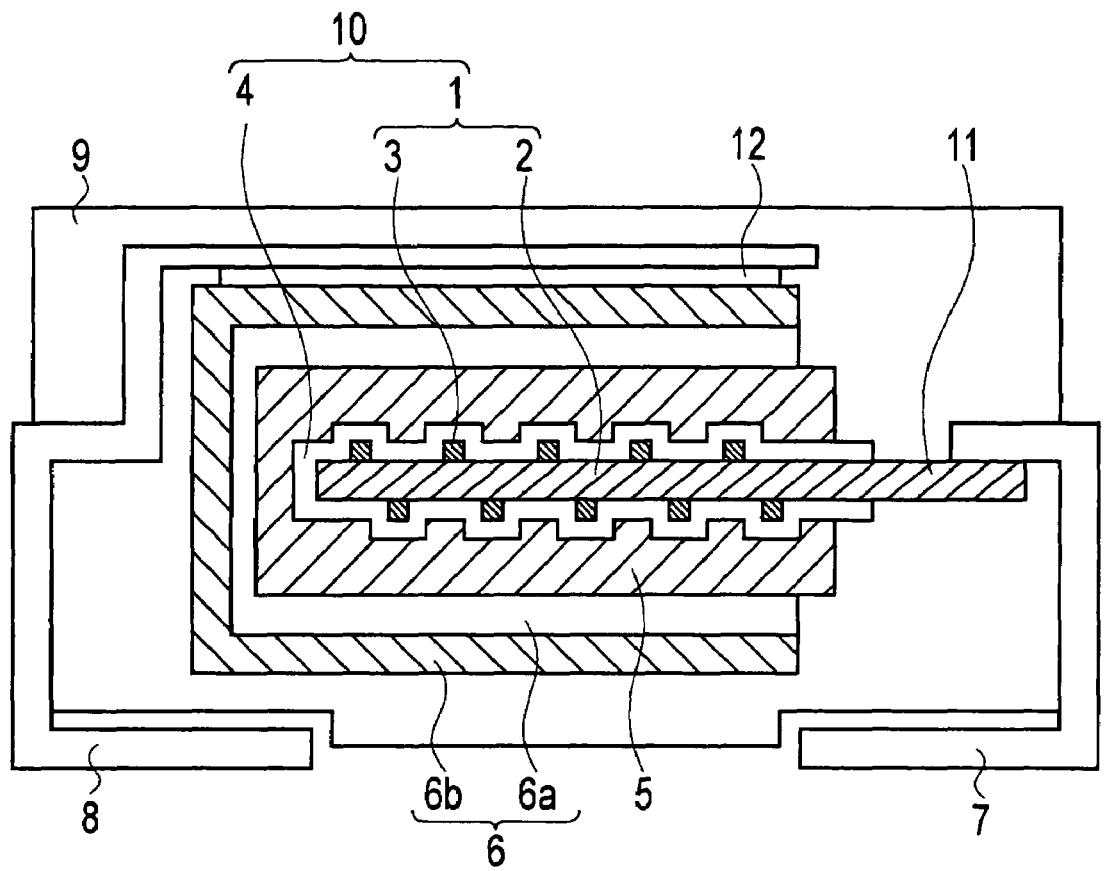
FIG. 1 is a cross-sectional view of a solid electrolytic capacitor according to an embodiment of the present invention.

FIG. 1 is a schematic cross-sectional view of a solid electrolytic capacitor of this embodiment.

As shown in FIG. 1, in the solid electrolytic capacitor of this embodiment, an anode 1 includes a first metal layer 2 and second metal layers 3. The first metal layer is made of any of metal selected from niobium, aluminum and tantalum, or an alloy containing any of metal selected from niobium, aluminum and tantalum as a main component. The second metal layers 3 contain any of metal selected from titanium, zirconium and hafnium. Parts of a surface of the first metal layer 2 are covered with the second metal layers 3. Moreover, an anode lead 11 extends from this anode 1.

According to this configuration, it is conceivable that the metal, namely, titanium, zirconium or hafnium forming the second metal layers function as a deoxidizer, and is therefore oxygen contained in the first metal layer can be reduced. Hence, it is possible to suppress formation of defects in the first metal layer at the time of forming a dielectric layer 4 to be described later, by means of anodization. Thereby, a solid electrolytic capacitor with a reduced leakage current can be obtained.

Figure 2:
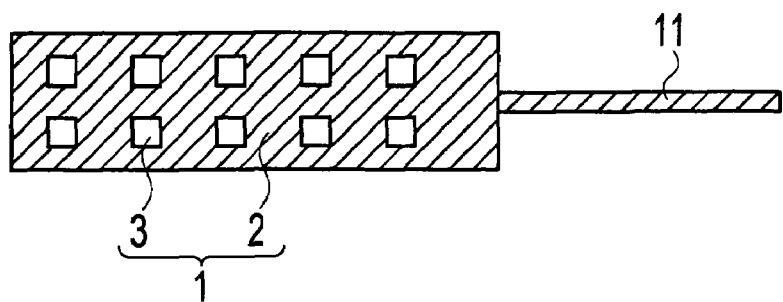
FIG. 2 is a top plan view for explaining a structure of an anode of the solid electrolytic capacitor according to the embodiment of the present invention.

FIG. 2 is a schematic top plan view of the anode 1 as viewed from above in FIG. 1. Parts of the surface of the first metal layer 2 are covered with the second metal layers 3.

In this embodiment, square regions, as regions of the respective second metal layers 3, are dotted on both surfaces of the first metal layer 2, as shown in FIG. 1 and FIG. 2. However, the present invention is not limited to this configuration. The regions may be in another shape such as a line shape or a rib shape. The layout of the second metal layers 3 on the first metal layer 2, and a positional relationship among the plurality of regions of the respective second metal layers 3 may be adjusted as appropriate. Moreover, it is preferable that the regions of the second metal layers 3 are dispersed uniformly, instead of concentrated locally on the surface of the first metal layer 2.

The area of the first metal layer covered with the second metal layers is preferably set in a range of 0.5% to 10% inclusive, of the surface area of the first metal layer. If the coverage is less than 0.5%, an effect of reducing the oxygen concentration in the first metal layer is considered to be relatively limited. On the other hand, if the coverage exceeds 10%, a leakage current through defects formed on a surface of the second metal layer is increased. For this reason, the effect of reducing the leakage current of the entire capacitor is considered to be limited. Nevertheless, even when there are defects on the surfaces of the respective second metal layers, the effect of reducing the leakage current achieved by suppressing the defects on the first metal layer, is more significant. Accordingly, even if the coverage exceeds 10%, it is still possible to reduce the leakage current more than in a case of the conventional art.

Then, the anode 1 is subjected to anodization in an electrolyte to form a dielectric layer 4 made of an oxide on the surface of this anode 1.

The aforementioned anode 1 and the dielectric layer 4 collectively form a capacitor element 10.

An electrolytic layer 5 is formed in a way that the electrolytic layer 5 covers a surface of this dielectric layer 4. Here, a conductive polymer material such as polypyrrole, polythiophene or polyaniline, a conductive oxide such as manganese dioxide, and the like may be used as the material for the electrolytic layer 5.

Thereafter, at the time of forming a cathode 6 in a way that the cathode 6 covers a surface of the electrolytic layer 5, a carbon layer 6a is firstly formed on the electrolytic layer 5 by use of carbon paste, and then a silver layer 6b is formed on this carbon layer 6a by use of silver paste.

In the solid electrolytic capacitor of this embodiment, an anode terminal 7 made of nickel-plated iron is connected to an anode lead 11 extending from the above anode 1, by means of welding. A cathode terminal 8 made of nickel-plated iron is connected to the silver layer 6b of the above cathode 6 with a conductive adhesive layer 12 interposed in between. Then, the solid electrolytic capacitor is packaged by use of an outer package 9 made of insulative resin such as epoxy resin, while drawing the anode terminal 7 and a cathode terminal 8 to the outside.

As described above, in the solid electrolytic capacitor of the embodiment shown in FIG. 1, the cathode 6 is formed by laminating the silver layer 6b in which the silver paste is used, on the carbon layer 6a in which the carbon paste is used. Alternatively, it is possible to provide only the silver layer 6b that covers the surface of the electrolytic layer 5 while not providing the carbon layer 6a. Moreover, the anode 1 may be formed of a metal foil or a porous sintered body shaped into circular cylinder or plate or the like.

EXAMPLES

Next, solid electrolytic capacitors according to examples of this invention will be described. In addition, with descriptions using comparative examples, it will be clear that an increase in the leakage current is suppressed in the solid electrolytic capacitors according to the examples of this invention. It is to be noted that the solid electrolytic capacitors of this invention is not limited to those described in the following examples, and that various modifications are possible without departing from the scope of the invention.

Example 1

A niobium foil having a thickness of 100 μm was used as a first metal layer 2 and a titanium film having a thickness of 0.1 μm was formed on a surface of the niobium foil. Here, conditions for forming the titanium foil were a pressure of $1\times10^{-5}$ Torr in a chamber; an arc current of 100 A; titanium as a base material; a base material bias voltage of 20 V; and vapor deposition time of 15 seconds.

After the first metal layer 2, in which the titanium film is formed, was cleaned by use of acetone, photoresist made of acrylic resin was coated on the surface of the titanium film, and was dried at 90° C. for 15 minutes.

Subsequently, a meshed exposure film mask, of which an exposed portion was equal to 3% of the surface area of the niobium foil, was aligned. Then, the photoresist was exposed (exposure conditions: 100 mV/cm$^2$, 30 sec).

Thereafter, an unexposed portion of the photoresist was removed by dipping the first metal layer 2 in xylene, and then by drying the first metal layer 2. Thereby, the titanium layer was exposed.

These constituents were dipped in a sulfuric acid aqueous solution having a concentration of 2 mol/L. Thereby, the exposed titanium was removed by wet etching. Moreover, the second metal layers 3 respectively formed into a plurality of dots of square regions, were fabricated by removing the remaining photoresist.

The thus fabricated anode 1 was subjected to analysis of its proportion of the regions of the first metal layer covered with the second metal layers. Specifically, the surface of the anode 1 was analyzed in accordance with element mapping of titanium and niobium by use of an electron probe microanalysis (EPMA). As a result, portions covered with titanium were equal to 3% of the total surface area of titanium and niobium.

The anode 1 was subjected to anodization in a 1-wt % phosphoric acid aqueous solution for 30 minutes at a temperature of 60° C. while applying a constant voltage of 10 V. Thus, the dielectric layer 4 having thickness of 25 nm was formed.

In this way, the capacitor element 10 (sample name: A1) including the anode 1 and the dielectric layer 4 was fabricated.

Example 2

The capacitor elements 10 (sample names coded as A2, A3, A4, A5, A6, A7, and A8, respectively) were formed in a similar manner to that in Example 1 except that the exposure processes of the photoresist were executed by use of various exposure film masks of which exposed portions were equal to 0.3%, 0.5%, 1%, 5%, 10%, 13%, and 15%, respectively, of the surface area of the niobium foil.

These capacitor elements were subjected to analyses of the surfaces of the anodes 1 in accordance with element mapping of titanium and niobium by use of the EPMA as in the case of Example 1. As a result, the portions covered with titanium were equal to 0.3%, 0.5%, 1%, 5%, 10%, 13%, and 15%, respectively, of the total surface area of titanium and niobium.

Comparative Example 1

The capacitor element 10 (sample name: X1) was fabricated in a similar manner to that in Example 1 except that a niobium foil not covered with titanium is used instead of the niobium foil with its niobium surface partially covered with titanium.

Comparative Example 2

Potassium fluoride in the amount of 1.5 kg and potassium chloride in the amount of 1.5 kg were put into a reaction container having a volume of 5 L. Then, these substances were heated up to 850° C., and were formed into a melt. Thereafter, a nozzle was inserted to this melt, and nitrogen gas was introduced into the melt by bubbling the nitrogen gas at a flow rate of 750 mL/min. A niobium foil having a thickness of 100 μm was inserted to this melt. One minute later, fused sodium in the amount of 5.8 g was added to the melt, and these substances were reacted to each other for 2 minutes. A nitrogen-added niobium anode was formed by repeating this series of operations 30 times. The capacitor element 10 (sample name: X2) was fabricated in a similar manner to that in Example 1 except for these operations.

(Evaluation)

Figure 3:
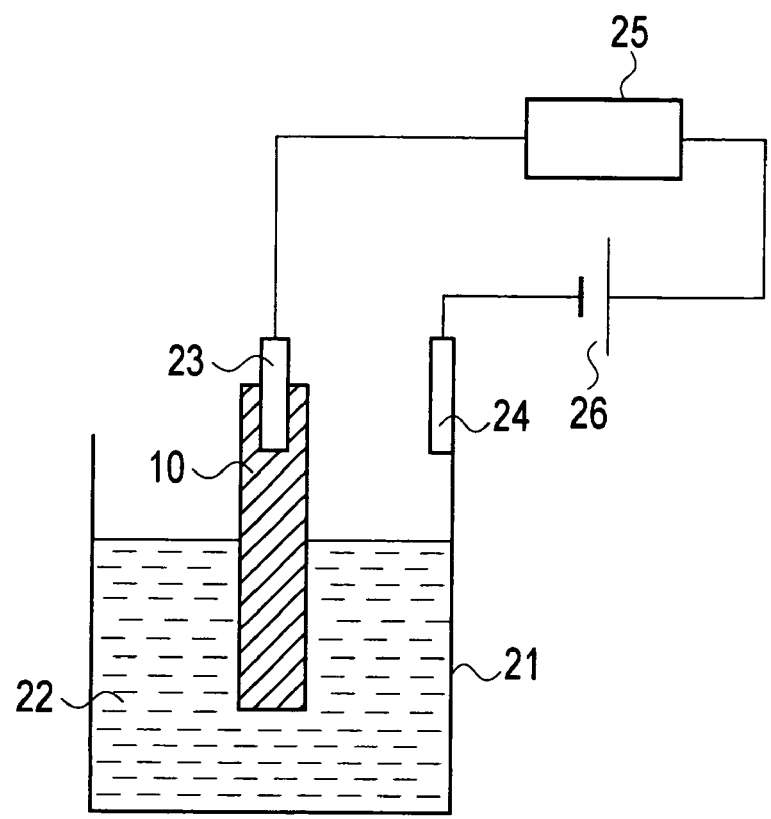
FIG. 3 is a schematic diagram for explaining a system for measuring a leakage current in a capacitor element.

The leakage currents in the capacitor elements fabricated as described above were measured. FIG. 3 is a schematic diagram for explaining a method of measuring the leakage current. As shown in FIG. 3, the measurement was carried out as follows. Specifically, each of the capacitor elements 10 was dipped into a 1-wt % phosphoric acid aqueous solution 22 which was put in a metal container 21. Then, an anode 23 for measurement was connected to one end of the capacitor element 10 where dielectric layer 4 is not formed, and a cathode 24 for measurement was connected to one end of the metal container 21. Moreover, the anode 23 for measurement and the cathode 24 for measurement were respectively connected to an ammeter 25 and a direct-current power source 26. Thereafter, a voltage of 3 V was applied from the direct-current power source 26. Thereby, a current value was measured after 20 seconds from the time when the voltage application started.

Results of measurement of the leakage currents of the respective capacitor elements are shown in Table 1.

TABLE 1

| Sample name | | Proportion of portions covered with second metal layers (%) | Leakage current (μA) |
|---|---|---|---|
| A2 | Example 2 | 0.3 | 35 |
| A3 | | 0.5 | 15 |
| A4 | | 1 | 13 |
| A1 | Example 1 | 3 | 10 |
| A5 | Example 2 | 5 | 12 |
| A6 | | 10 | 15 |
| A7 | | 13 | 30 |
| A8 | | 15 | 32 |
| X1 | Comparative Example 1 | — | 50 |
| X2 | Comparative Example 2 | — | 40 |

As is apparent from Table 1, the leakage current was reduced more significantly in Comparative Example 2 using the nitrogen-added niobium foil than in Comparative Example 1 using the niobium foil not covered with titanium. On the other hand, the leakage currents were reduced even more significantly in Example 1 and Example 2 which used the niobium foils covered with titanium. Moreover, among the samples of Example 1 and Example 2, it is apparent that the leakage currents were remarkably reduced in the cases of the samples A1, A3, A4, A5, and A6 that respectively used the anodes with their portions covered with titanium, the portions being in the range of 0.5% to 10% inclusive, of the total surface area of niobium and titanium.

When the coverage is less than 0.5%, the effect of reducing the oxygen concentration in the first metal layer made of niobium is considered to be relatively limited. On the other hand, if the coverage exceeds 10%, the leakage current through defects formed on the surfaces of the second metal layers is increased due to an increase in the surface areas of the second metal layers made of titanium. The effect of reducing the leakage current in the entire capacitor is considered to be reduced, because the occurrence of defects in the first metal layer can be suppressed while the defects are caused on the surfaces of the second metal layers. Accordingly, the effect of reducing the leakage current can be obtained more effectively when the coverage is set in the range of 0.5% to 10% inclusive.

It is confirmed that the area of the regions of the first metal layer covered with the second metal layers is set preferably in the range of 0.5% to 10% inclusive, of the surface area of the first metal layer.

Next, a relationship between the metal material forming the second metal layers and the leakage current was examined.

Example 3

The capacitor elements 10 (sample names coded respectively as B1 and B2) are formed in a similar manner to that in Example 1 except that zirconium and hafnium, instead of titanium, were used as the metal material forming the second metal layers.

The capacitor elements of Example 3 were subjected to analyses of their surfaces of the anodes 1 in accordance with element mapping of either zirconium (B1) or hafnium (B2), and niobium by use of the EPMA. The analyses were carried out in a similar manner to that in Example 1. As a result, in the case of mapping of zirconium (B1) and niobium, portions covered with zirconium (B1) were equal to 3% of the total surface area of the zirconium (B1) and niobium. In the case of mapping of hafnium (B2) and niobium, portions covered with hafnium (B2) were also equal to 3% of the total surface area of the hafnium (B2) and niobium.

Results of measurement of the leakage currents of the respective capacitor elements are shown in Table 2.

TABLE 2

| Sample name | | Material for second metal layers | Proportion of portions covered with second metal layers (%) | Leakage current (μA) |
|---|---|---|---|---|
| B1 | Example 3 | zirconium | 3 | 12 |
| B2 | | hafnium | 3 | 13 |
| A1 | Example 1 | titanium | 3 | 10 |

As is apparent from Table 2, when zirconium or hafnium was used as the material for the second metal layers, the leakage current was remarkably reduced as in the case of using titanium, in comparison with the above-described Comparative Example 1 and Comparative Example 2 where the first metal layer was not covered with the second metal layers.

Subsequently, a relationship between the metal material forming the first metal layer and the leakage current was examined.

Example 4

The capacitor element 10 (sample name: C1) was fabricated in a similar manner to that in Example 1 except that tantalum, instead of niobium, was used as the material forming the first metal layer.

Example 5

In this example, the capacitor element 10 (sample name: C2) was fabricated in a similar manner to that in Example 1 except that aluminum was used as the material forming the first metal layer, and that anodization was carried out by use of a 1.5-wt % ammonium adipate aqueous solution, instead of using niobium as the material for the first metal layer and of carrying out anodization in the 1-wt % phosphoric acid aqueous solution.

Comparative Example 3

The capacitor element 10 (sample name: X3) was fabricated in a similar manner to that in Comparative Example 1 except that a tantalum foil not covered with titanium was used for the anode 1 instead of using the niobium foil not covered with titanium.

Comparative Example 4

The capacitor 10 (sample name: X4) was fabricated in a manner similar to that in Comparative Example 1 except that an aluminum foil not covered with titanium was used as the anode, and that anodization was carried out by use of the 1.5-wt % ammonium adipate aqueous solution, instead of using niobium not covered with titanium as the anode 1 and of carrying out anodization in the 1-wt % phosphoric acid aqueous solution.

The capacitor elements of Example 4 and Example 5 were subjected to analyses of their surfaces of the anodes 1 in accordance with element mapping of titanium, and either tantalum (C1) or aluminum (C2), by use of the EPMA. The analyses were carried out in a similar manner to that in Example 1. As a result, in the case of mapping of titanium and tantalum (C1), portions covered with titanium were equal to 3% of the total surface area of the titanium and tantalum (C1). In the case of mapping of titanium and aluminum (C2), portions covered with titanium were also equal to 3% of the total surface area of the titanium and aluminum (C2).

Results of measurement of the leakage currents of the respective capacitor elements are shown in Table 3.

TABLE 3

| Sample name | | Material for first metal layer | Material for second metal layers | Proportion of portions covered with second metal layers (%) | Leakage current (µA) |
|---|---|---|---|---|---|
| C1 | Example 4 | tantalum | titanium | 3 | 10 |
| C2 | Example 5 | aluminum | titanium | 3 | 4 |
| X3 | Comparative Example 3 | tantalum | — | 0 | 20 |
| X4 | Comparative Example 4 | aluminum | — | 0 | 9 |

As is apparent from Table 3, when tantalum or aluminum was used as the material for the first metal layer, the leakage current was remarkably reduced as in the case of using niobium, in comparison with the above-described Comparative Example 3 and Comparative Example 4 where the first metal layer was not covered with the second metal layers.

Subsequently, a relationship between a configuration of the first metal layer and the leakage current was examined.

Example 6

(Step 1)
A niobium powder of 0.99 g forming the first metal layer and a titanium powder of 0.01 g forming the second metal layer were mixed in a planetary ball mill, in which hard metal balls were used for media, for 4 hours. Thereby, a mixed powder dispersed uniformly was obtained. A pellet was fabricated by press forming the obtained powder and a niobium lead wire at once. Consequently, the fabricated pellet was sintered in reduced pressure ($3 \times 10^{-5}$ Torr), at 1100° C., and then a sintered body in which a surface of niobium is partially covered with titanium was obtained.

Figure 4:
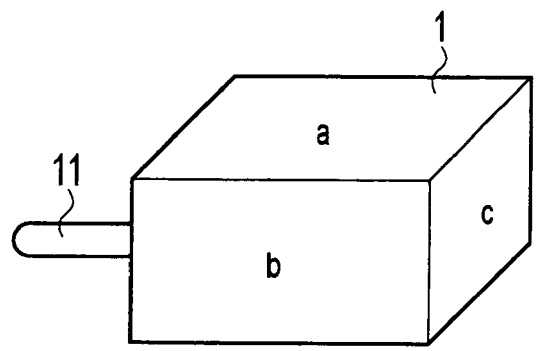
FIG. 4 is diagram for explaining an observation method of an anode 1 by use of a scanning electron microscope (SEM).

For examining a ratio of a region on the first metal layer covered with the second metal layer, with respect to the anode 1 fabricated as described above, a cross-sectional surfaces were observed by use of the scanning electron microscope (SEM). Each of the cross-sectional surfaces is parallel to respective surfaces a, b, and c shown in FIG. 4, and passes thorough respective arbitrary points on the anode 1. As a result of calculating a part covered with titanium accordingly, the part covered with titanium was equal to 3% of the total surface area of titanium and niobium.

(Step 2)
The anode 1 was subjected to anodization in a 1-wt % phosphoric acid aqueous solution for 10 hours at a temperature of 60° C. while applying a constant voltage of 10 V. Thus, the dielectric layer 4 having thickness of 25 nm was formed.

Thereby, the capacitor element 10 (sample name: D1) formed of the anode 1 and the dielectric layer 4 was fabricated.

Comparative Example 5

The capacitor element 10 (sample name: X5) was fabricated in a similar manner to that in Example 6 except for following operations in (Step 1) of Example 6. Specifically, in the capacitor element 10 of Comparative Example 5, a sintered niobium body was used as anode 1 instead of the sintered body where the surface of the niobium was covered with the titanium, the sintered niobium body was obtained by sintering a pellet in a reduced pressure ($3 \times 10^{-5}$ Torr) at 1100° C., while the pellet was fabricated by press forming a niobium powder and a niobium lead wire at once.

Results of measurement of the leakage current of the respective capacitor element are shown in Table 4.

TABLE 4

| Sample name | | Material for first metal layers | Material for second metal layers | Proportion of portions covered with second metal layers (%) | Constitution of first metal layer | Leakage current (µA) |
|---|---|---|---|---|---|---|
| D1 | Example 6 | niobium | titanium | 3 | Sintered body of power | 12 |
| X5 | Comparative Example 5 | niobium | — | — | Sintered body of power | 55 |

As is apparent from Table 4, when the constitution of the first metal layer was sintered body, the leakage current was remarkably reduced as in the case of using the metal foil as the first metal layer, in comparison with the Comparative Example 5 where the first metal layer was not covered with the second metal layers.

As described above, the capacitor elements according to these examples makes it possible to reduce the leakage currents in the capacitors.

Accordingly, the solid electrolytic capacitor according to the present invention in which any of the capacitor elements of these examples is used makes it possible to reduce the leakage current.

It is to be noted that the examples disclosed herein are exemplary in all aspects, and are therefore not deemed to be restrictive in any aspects. The scope of the preset invention is defined not by the explanations of the examples described above, but by the appended claims. Moreover, it is to be understood that the present invention encompasses all modifications within the significance and the range equivalent to the appended claims.

For example, the electrolytic layer 5 is made of polypyrrole in the embodiment. However, the present invention is not limited to this configuration, and other conductive polymers may be used as the main component. Alternatively, manganese oxide may be used as the main component.

Meanwhile, the first metal layer is made of any of niobium, tantalum, and aluminum in the above-described examples. However, the present invention is not limited only to these configurations. For example, an alloy containing any of these valve metal materials as the main component may be used.

Moreover, the phosphoric acid aqueous solution and the ammonium adipate aqueous solution are used for anodization of the anodes 1 in the above-described examples. However, the present invention is not limited to these configurations. For example, the type of aqueous solution may be a fluorine-containing aqueous solution such as an ammonium fluoride aqueous solution, a potassium fluoride aqueous solution, a sodium fluoride aqueous solution or a hydrofluoric acid aqueous solution, and sulfuric acid, for example.

What is claimed is:

1. A solid electrolytic capacitor,
   provided with an anode, a cathode, and a dielectric layer formed by anodization of the anode, wherein,
   the anode includes a first metal layer and a second metal layer,
   the first metal layer is made of any of a metal selected from the group consisting of niobium, aluminum and tantalum, or an alloy containing any of a metal selected from the group consisting of niobium, aluminum and tantalum as a main component,
   the second metal layer contains any of a metal selected from the group consisting of titanium, zirconium and hafnium, and
   a part of a surface of the first metal layer is covered with the second metal layer, wherein an area of a region of the first metal layer covered with the second metal layer is between 0.5% and 10% of a surface area of the first metal layer.

2. A solid electrolytic capacitor,
   provided with an anode, a cathode, and a dielectric layer formed by anodization of the anode, wherein,
   the anode includes a first metal layer and a second metal layer,
   the first metal layer is made of any of a metal selected from the group consisting of niobium, aluminum and tantalum, or an alloy containing any of a metal selected from the group consisting of niobium, aluminum and tantalum as a main component,
   the second metal layer contains any of a metal selected from the group consisting of titanium, zirconium and hafnium, and
   a part of a surface of the first metal layer is covered with the second metal layer,
   wherein,
   the second metal layer is dispersed over a plurality of separate regions of the surface of the first metal layer.

* * * * *